United States Patent [19]

Tanihara et al.

[11] Patent Number: 4,530,768

[45] Date of Patent: Jul. 23, 1985

[54] METHOD FOR THE DISPOSAL OF WASTE WATER CONTAINING IRON-CYANIDE COMPLEXES

[75] Inventors: Koichi Tanihara, Ogoori; Keiko Tamai; Seiji Yasuda, both of Tosu, all of Japan

[73] Assignee: Director-General of the Agency of Industrial Science and Technology, Tokyo, Japan

[21] Appl. No.: 577,354

[22] Filed: Feb. 6, 1984

[51] Int. Cl.$^3$ .............................................. C02F 1/70
[52] U.S. Cl. ...................... 210/719; 75/107; 210/724; 210/726; 210/757; 210/904; 423/367
[58] Field of Search ............... 75/107; 204/DIG. 13; 210/719, 724, 726, 738, 757, 904, 912; 423/367

[56] References Cited

U.S. PATENT DOCUMENTS

| | | | |
|---|---|---|---|
| 2,039,656 | 5/1936 | Mills et al. | 75/107 |
| 2,112,298 | 3/1938 | Mills et al. | 75/107 |
| 3,505,217 | 4/1970 | Morico | 210/757 |
| 3,736,239 | 5/1973 | George et al. | 210/904 |

FOREIGN PATENT DOCUMENTS

| | | | |
|---|---|---|---|
| 54-28452 | 3/1979 | Japan | 210/757 |
| 57-5598 | 6/1980 | Japan | |
| 57-24690 | 2/1982 | Japan | 210/719 |
| 2091713 | 8/1983 | United Kingdom | 210/904 |

Primary Examiner—Peter Hruskoci
Attorney, Agent, or Firm—Brisebois & Kruger

[57] ABSTRACT

The invention provides an improvement in the disposal of a waste water containing iron-cyanide complexes including ferricyanides by the reduction of the ferricyanide ions into ferrocyanide in the presence of a zinc salt to precipitate the ferrocyanide ions in the form of zinc ferrocyanide. The improvement comprises the use of a sulfite, e.g. sodium sulfite, and a thiosulfate, e.g. sodium thiosulfate, in combination as the reducing agent whereby the reduction of the ferricyanide ions is complete within a relatively short time without being affected by the atmospheric oxygen or other factors.

12 Claims, 5 Drawing Figures

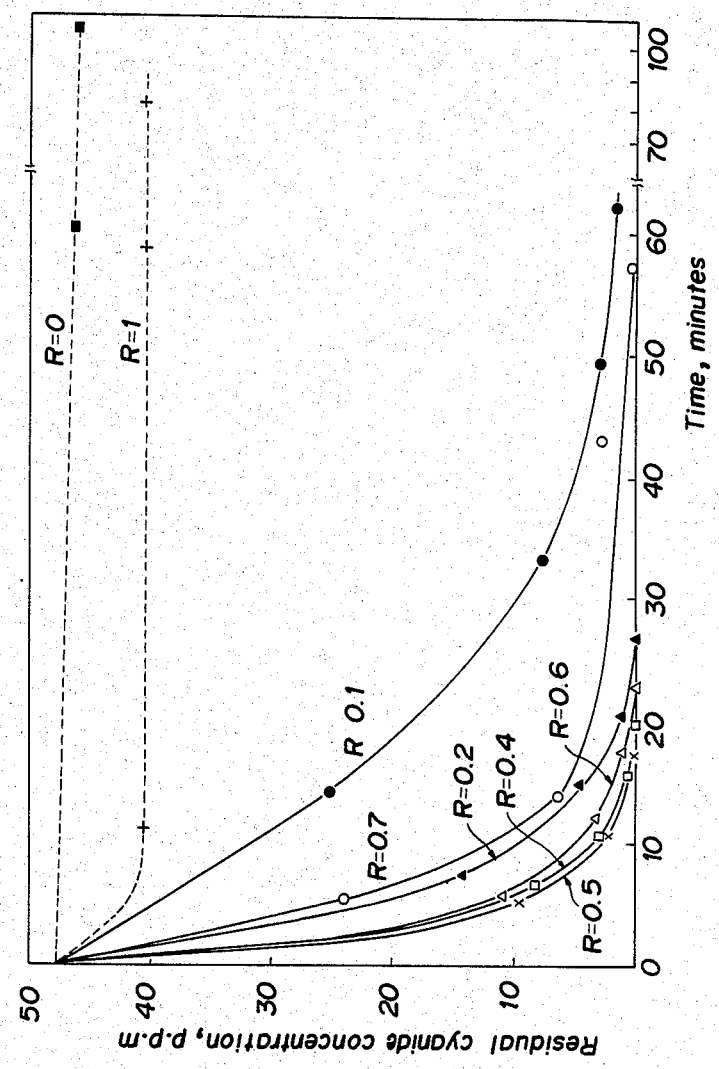

METHOD FOR THE DISPOSAL OF WASTE WATER CONTAINING IRON-CYANIDE COMPLEXES

BACKGROUND OF THE INVENTION

The present invention relates to a method for the disposal of waste water containing iron-cyanide complexes including ferricyanides by reducing in the presence of zinc ions to precipitate zinc ferrocyanide.

Iron-cyanide complexes, e.g. ferricyanides and ferrocyanides, are sometimes contained in waste water or sewage discharged from, for example, photographic processing laboratories, metal-plating plants, factories for cementation or nitriding of steels, warehouses for fumigation of vegetables and fruits, smelteries by the cyanide process and others. It is strictly required by laws and regulations that the concentration of cyanides in any waste water discharged to public waterways must be reduced to 1 ppm or below.

Several methods are known in the prior art for the removal of iron-cyanide complexes from waste water including the methods of chemical, electrochemical or photochemical decomposition, physical or physicochemical methods of concentration by ion-exchange, electrosmosis, reverse osmosis and the like, adsorption methods by use of an adsorbent such as an active charcoal and precipitation methods by use of a precipitant.

Each of these prior art methods is, however, not quite satisfactory in one or more respects. For example, the method of decomposition must be performed under very critical reaction conditions due to the high chemical stability of the iron-cyanide complexes and no satisfactorily high velocity of decomposition can be obtained even by the consumption of large quantities of expensive energies such as electric and light energies and use of a special apparatus so that the method is economically disadvantageous. The methods of physical concentration are defective due to the outstanding expensiveness of the apparatuses used in the method in addition to the problem that the thus concentrated waste water relative to the concentration of the iron-cyanide complexes must be subjected to a secondary treatment by the method of decomposition, precipitation and the like to remove the complexes before the waste water is discharged. Further, the method of adsorption is practically not feasible because of the unavailability of an inexpensive adsorbent having a large capacity and good selectivity for the adsorption of cyanide complexes.

The method of precipitation is suitable for the treatment of large volumes of waste water. There are several problems, however, even in the prussian blue method, which is the only method now practically undertaken, by use of an iron salt as the precipitant. For example, the process is not free from the influences of the atmospheric oxygen and the effect of variation in the value of pH affecting the solubility behavior of the precipitates so that a very strict process control is indispensable to obtain reliable results even by setting aside the inherent problem that the method is not sufficiently effective to satisfy the requirement of the regulations for the maximum cyanide concentration in waste water which sometimes exceeds a few ppm even in the most favorable cases by the precipitation method.

A modification of the precipitation method is proposed in Japanese Patent Publication No. 57-5598 in which the iron-cyanide complexes including ferricyanide compounds in a waste water is reduced by a reducing agent in the presence of zinc ions so as to convert the iron-cyanide complexes into zinc ferrocyanide which is precipitated and removed by filtration.

The reducing agents used in the above proposed method include thiosulfates, sulfites, pyrosulfites, dithionites, salts of hydrazine, salts of hydroxylamine and the like. This method is advantageous in comparison with the method in which the ferricyanide ions are first reduced by the reducing agent into ferrocyanide ions followed by the precipitation of zinc ferrocyanide by use of a zinc salt in respect of the rapidness of the treatment and the completeness of decrease in the residual cyanide concentration which can be 1 ppm or smaller without particular difficulties. This known method is, however, not quite satisfactory because the above named reducing agents are each not free from one or more problems. For example, the salts of hydrazine and hydroxylamine are too expensive to ensure wide applicability of the method in practice. The sulfites, pyrosulfites and dithionites are highly susceptible to the oxidizing influence of atmospheric oxygen dissolved in the waste water. The thiosulfates are, on the other hand, relatively free from the oxidizing influence of the dissolved oxygen but this advantage is cancelled by the disadvantage that the velocity of the precipitation of zinc ferrocyanide is relatively low with a reducing agent of this class.

As is described above, the above mentioned reducing agents have their respective advantages and disadvantages so that each of them requires particular treatment conditions in the practical application of the method. When sodium sulfite is used as the reducing agent, for example, the reduction of the ferricyanide ions is quite incomplete to leave a large amount of the unreduced ferricyanide ions as is shown by the comparative example given later, by the addition of an equimolar amount of the reducing agent such as sodium sulfite, sodium hydrogensulfite and sodium pyrosulfite and 2.5 times by moles of a zinc salt to the ferricyanide ions in the waste water so that the amount of the reducing agent must be increased greatly, for example, up to $8 \times 10^{-4}$ moles/liter or larger for the ferricyanide ion concentration as in the comparative example. When sodium thiosulfate is used as the reducing agent in an equimolar amount to the ferricyanide ions in the waste water, a treatment time of as long as 120 minutes or longer is required to decrease the residual cyanide concentration to 1 ppm CN or smaller as is shown in the comparative example given later so that practical applicability can hardly be found industrially with this method.

As is mentioned above, furthermore, sulfites are highly susceptible to the oxidation by the atmospheric and dissolved oxygen to the loss of their reducing activity so that certain measure should be undertaken to prevent oxidation of the sulfite ions by the oxygen. It is known in the art that alcohols, or in particular, benzyl alcohol are very effective as an inhibitor of the air oxidation of sulfite ions. Unfortunately, the effectiveness of benzyl alcohol as an inhibitor of air oxidation of sulfite ions can hardly be exhibited when it is used in combination with a sulfite in the presence of a zinc salt for the treatment of ferricyanide ions.

Thus, it has been eagerly desired to develop an effective method for the disposal of waste water containing iron-cyanide complexes including ferricyanides in a process of reduction of the ferricyanide ions to ferrocyanide ions followed by precipitation of zinc ferrocyanide in the presence of a zinc salt by use of a relatively small amount of the reducing agent within a relatively short treatment time.

SUMMARY OF THE INVENTION

It is therefore an object of the present invention to provide a novel and effective method for the disposal of a waste water containing iron-cyanide complexes including ferricyanide ions.

More particularly, the object of the present invention is to provide a novel and efficient method for the reduction of ferricyanide ions in a waste water into ferrocyanide ions with a reducing agent followed by the precipitation of zinc ferrocyanide in the presence of a zinc salt in which the amount of the reducing agent can be decreased as far as possible and the treatment should be complete within a relatively short time.

Thus, the present invention provides an improvement, in a method for the disposal of a waste water containing iron-cyanide complexes including ferricyanide ions by the reduction of the ferricyanide ions into ferrocyanide ions by use of a reducing agent followed by the precipitation of the ferrocyanide ions in the form of zinc ferrocyanide in the presence of a zinc salt, comprising the use of a combination of a sulfite and a thiosulfate as the reducing agent. In particular, the reducing agent is a combination of a sulfite and a thiosulfate in a proportion, preferably, within a range from 1:10 to 6:1 by moles.

BRIEF DESCRIPTION OF THE DRAWING

FIGS. 4 and 5 are each a graphic showing of the residual cyanide concentration in an aqueous solution containing red prussiate of potash as a function of time when treated according to the inventive method with varied molar proportions of sodium sulfite to the total amount of sodium sulfite and sodium thiosulfate including the single use of either one of these reducing agents for comparative purpose.

DETAILED DESCRIPTION OF THE PREFERRED EMBODIMENTS

Figure 1:
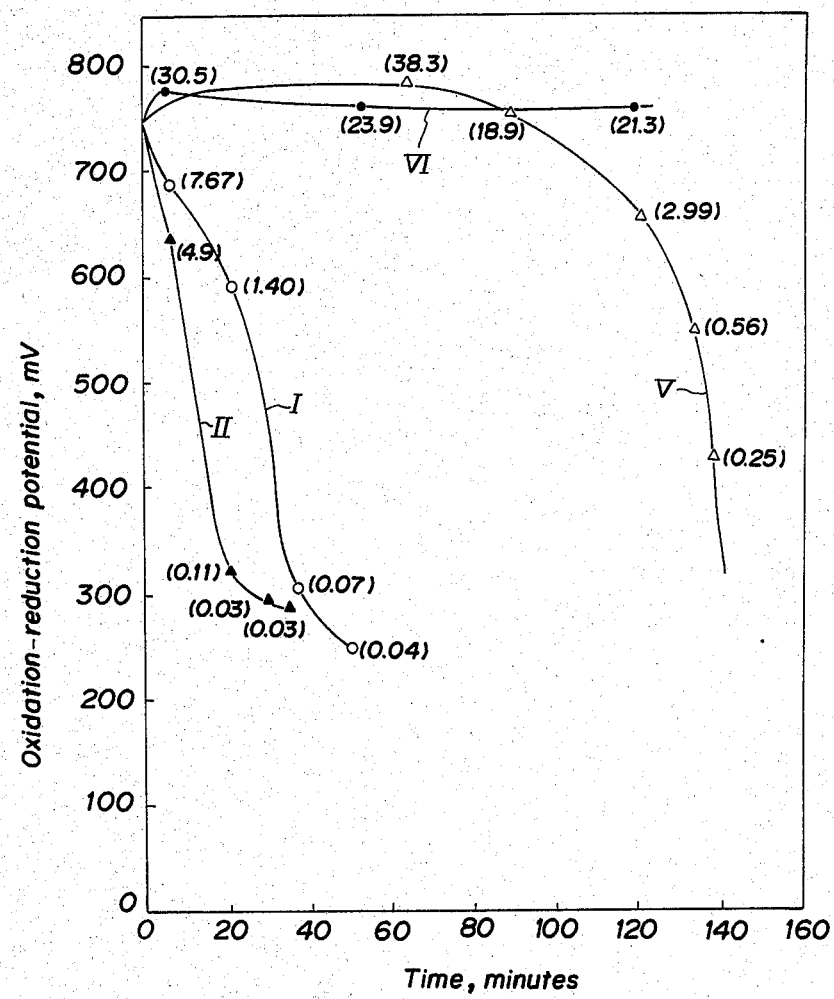
FIGS. 1, 2 and 3 are each a graphic showing of the oxidation-reduction potential of an aqueous solution containing red prussiate of potash, i.e. potassium ferricyanide, which is a measure of the residual cyanide concentration as a function of time when treated according to the inventive method (curves I, II, III and IV) or conventional methods (curves V and VI).

As is described above, the reducing agent used in the inventive method is a combination of a sulfite and a thiosulfate. These salts should of course be soluble in water. The sulfite here implied is a salt capable of forming sulfite ions when dissolved in water and alkali metal sulfites are preferred in the inventive method including sulfites, hydrogensulfites and pyrosulfites of sodium and potassium. These sulfites may be used either singly or as a combination of two kinds or more according to need.

The thiosulfate to be used in combination with the above mentioned sulfite is exemplified by thiosulfates of sodium, potassium and ammonium, of which sodium thiosulfate is preferred. Needless to say, thiosulfates themselves act as a reducing agent but it is noteworthy that, when a thiosulfate is used in combination with a sulfite reducing agent, the reducing activity of the system can be synergistically enhanced. Such a synergistic effect is unique and very specific to the thiosulfates and never can be obtained with other reducing agents such as dithionites and salts of hydrazine or hydroxylamine combined with a sulfite.

In respect of the proportion of the sulfite and the thiosulfate in the system of the reducing agent, the effectiveness of the treatment can be enhanced considerably even by the replacement of only a very small portion of a sulfite with an equimolar amount of a thiosulfate or vice versa so that the proportion of them can be varied in a wide range. It is, however, preferable that the proportion of the sulfite to the thiosulfate is in the range from 1:10 to 6:1 by moles although the exact proportion should be determined in consideration of the initial concentration of the ferricyanide ions in the waste water, the existence of other dissolved salts or concentration thereof and other factors. At any rate, the total amount of the sulfite and the thiosulfate must be sufficient to completely reduce all of the ferricyanide ions in the waste water under treatment.

The order of the additions of the sulfite and the thiosulfate to the waste water is not particularly limitative and either one of them can be added first. When a sulfite reducing agent is first added to the waste water followed by the addition of a thiosulfate, however, it is recommendable that the addition of the thiosulfate should follow the addition of the sulfite as quickly as possible. A convenient way usually undertaken is the first addition of a thiosulfate followed by the addition of a sulfite or the simultaneous addition of both each in the form of a solid salt or in the form of an aqueous solution prepared in advance by dissolving suitable amounts of them in water.

The acidity or alkalinity of the waste water to be treated according to the inventive method is of some significance to the efficiency of the treatment and the waste water is desirably at or in the vicinity of neutrality. When the waste water containing ion-cyanide complexes is acidic or alkaline, a neutralization treatment should precede the treatment according to the inventive method, if necessary.

The amount of the zinc salt contained in the waste water under treatment according to the inventive method should of course be sufficient to precipitate all of the iron-cyanide complex ions in the form of zinc ferrocyanide. When the waste water initially contains ferrocyanide ions in addition to ferricyanide ions, it is important that the zinc salt is added to the waste water in an excess amount by at least two times by moles of the coexistent ferrocyanide ions.

The end point of the reducing reaction by the reducing agent in the waste water can readily be determined by monitoring the oxidation-reduction potential of the waste water under treatment. The oxidation-reduction potential of an aqueous solution is decreased as the concentration of the ferricyanide ions decreases and the graphic curve showing the potential as a function of the ferricyanide concentration has a turning point corresponding to a residual ferricyanide concentration of about 1 to 0.5 ppm beyond which the potential rapidly decreases as the ferricyanide concentration further decreases so that the decrease in the residual ferricyanide concentration down to, for example, 0.1 ppm or below can readily be detected.

In a typical case, a zinc salt is added to a waste water approximately at neutrality containing a relatively small amount of coexistent solutes in such an amount that the residual concentration of zinc in the waste water after completion of the precipitation of zinc ferrocyanide is in the range from 1.5 to $4.5 \times 10^{-4}$ moles/liter together with the addition of the reducing agent as a combination of a sulfite and a thiosulfate in a 1:1 molar ratio to give an overall concentration of about 3 to $6 \times 10^{-4}$ moles/liter. In this case, the treatment can be performed under atmospheric air and the residual cyanide concentration in a waste water, which initially contained 1 to 95 ppm of ferricyanide ions, can be reduced to 0.1 ppm CN or below within about 30 minutes. When the waste water contains certain substances having a retarding effect on the reducing reaction of the ferricyanide ions, such as a salt of an alkali or alkaline earth metal, dissolved therein, the amounts of the zinc salt and the reducing agent should be increased correspondingly.

In accordance with the inventive method, for example, it is possible to reduce the residual cyanide concentration well to 0.1 ppm or below to achieve substantially complete removal of the iron-cyanide complexes within a relatively short treatment time of about 30 minutes only by a mere combined use of a sulfite and a thiosulfate, e.g. sodium thiosulfate, in an amount of a half of the stoichiometrically equivalent amount of the former to the ferricyanide ions calculated as the sulfite ions and an amount of the latter equal to about a half of that in the above given example or in Comparative Example 1 given later. Moreover, the efficiency of the treatment is absolutely free from the adverse influence of oxygen or, rather, the effectiveness of decreasing the ferricyanide ion concentration is somewhat increased as a trend when pure oxygen is blown into the waste water. This is quite a surprising effect in clear contrast to the hitherto widely accepted understanding in the prior art of the related technologies.

As is understood from the above description, the method of the present invention is practically very advantageous because almost complete removal of the iron-cyanide complexes in a waste water can readily be achieved without using a large excess amount of the reducing agent as a result of the full utilization of the sulfite reducing agent which is freed from the loss of the reducing activity caused by the air oxidation in addition to the advantage that the treatment according to the inventive method can be undertaken rapidly even in the presence of relatively large amounts of coexisting salts such as sodium sulfate.

In the following, the method of the present invention is described in more detail by way of examples and comparative examples, in which the experiments were undertaken in a thermostat controlled at 25° C. The determination of the overall cyanide concentration was performed by the pyridine-pyrazolone method or the atomic absorption spectrophotometry to give the concentration of iron which could be converted to the cyanide concentration. The determination of the concentration of the ferricyanide ions was performed by the absorption spectrophotometry at a wavelength of 420 nm. When control of the pH of the treated solution is adequate, diluted sulfuric acid or an aqueous solution of sodium hydroxide was used as an acid or alkali to cause only 5% or less of increment in the volume of the solution.

In the following description, the cyanide concentration refers to the concentration calculated as CN in each of the occurrences.

EXAMPLE 1

Into 100 ml of an aqueous solution at a pH of 6.5 containing red prussiate of potash in a concentration of 50 ppm as cyanide were successively added 1 ml of a 0.08 mole/liter aqueous solution of zinc sulfate and 1.6 ml of an aqueous solution containing sodium thiosulfate and sodium sulfite in combination each in a concentration of 0.01 mole/liter and the pH of the solution was maintained throughout at 6.5 by use of a pH-stat while the solution was under continuous agitation by use of a magnetic stirrer under atmospheric air. While the oxidation-reduction potential of the solution was continuously monitored throughout relative to a saturated silver chloride electrode, a portion of about 10 ml of the solution was taken periodically and analyzed for the residual cyanide concentration following filtration of the solution undertaken as quickly as possible by use of a membrane filter. When the residual cyanide concentration was relatively high, a considerably good coincidence was obtained between the concentration of the cyanide calculated from the ferricyanide concentration and the overall cyanide concentration so that an average value of them was taken as the residual cyanide concentration.

In this experiment, parallel measurements were undertaken in the lapse of time beginning with the start of the treatment for the residual cyanide concentration and the oxidation-reduction potential of the solution. The values of the oxidation-reduction potential in mV as determined are shown graphically as a function of time in minutes by the curve I in FIG. 1. Each of the numerical values given in brackets at each of the plotted points on the curves in this figure is the residual cyanide concentration in ppm determined concurrently with the oxidation-reduction potential. The values of the residual cyanide concentration in the solution are shown as a function of time by the curve indicated as $R=0.5$ in FIG. 4.

After 53 minutes from the start of the treatment, the remaining volume of the solution was filtered by use of a filter paper as quickly as possible and the residual cyanide concentration in the filtrate was determined by the pyridine-pyrazolone method to give a result of 0.04 ppm.

EXAMPLE 2

Into 100 ml of an aqueous solution at a pH of 6.5 containing red prussiate of potash in a concentration of 50 ppm as cyanide were added successively 1 ml of a 0.08 mole/liter aqueous solution of zinc sulfate and 1.6 ml of an aqueous solution containing sodium thiosulfate and sodium sulfite each in a concentration of 0.01 mole/liter maintaining the value of pH 6.5 by use of a pH-stat while pure oxygen gas was continuously blown into the solution to bubble therein. Measurements in the lapse of time were undertaken in the same manner as in the preceding example for the oxidation-reduction potential and the residual cyanide concentration in the solution. After 37 minutes from the start of the treatment, the remaining volume of the solution was filtered by use of a filter paper as quickly as possible and the filtrate was analyzed for the residual cyanide concentration by the pyridine-pyrazolone method to give a result of 0.03 ppm. The oxidation-reduction potential of the solution is shown as a function of time by the curve II in FIG. 1.

As is understood by the comparison of these results, blowing of oxygen into the solution is effective in the acceleration of the rate of decrease in the residual cyanide concentration. Such an excellent effect is quite in contrast to the technical knowledge widely accepted hitherto.

EXAMPLE 3

Figure 2:
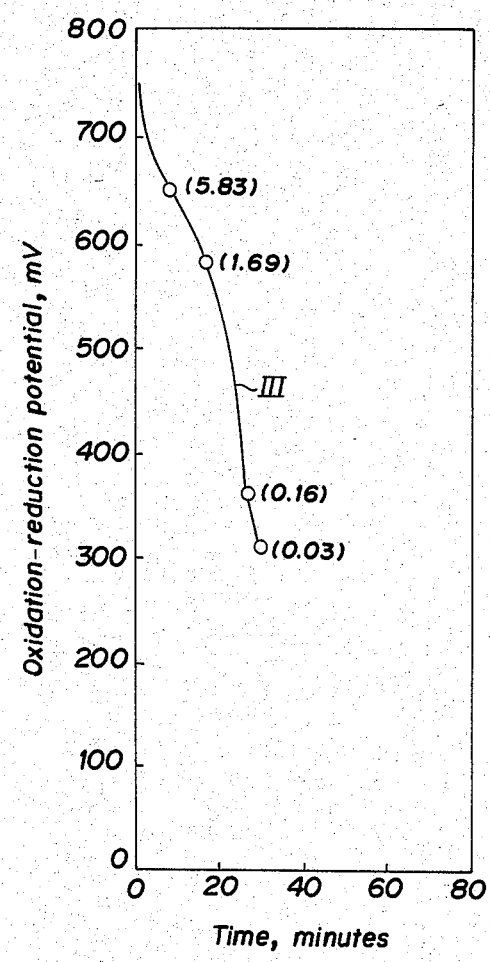

Into 98.4 ml of an aqueous solution at a pH of 6.5 containing red prussiate of potash in a concentration of 50.8 ppm as cyanide were successively added 1 ml of a 0.08 mole/liter aqueous solution of zinc sulfate, 1.6 ml of a 0.01 mole/liter aqueous solution of sodium thiosulfate and 1.6 ml of a 0.01 mole/liter aqueous solution of sodium hydrogensulfite in this order while maintaining the pH of 6.5 under continuous agitation in air by use of a magnetic stirrer. Measurements in the lapse of time were undertaken in the same manner as in Example 1 for the oxidation-reduction potential and the residual cyanide concentration in the solution to give the results shown in FIG. 2 as a function of time. After 31 minutes from the start of the treatment, the remaining volume of the solution was filtered by use of a filter paper as quickly as possible and the filtrate was analyzed for the residual cyanide concentration by the pyridine-pyrazolone method to give a result of 0.03 ppm.

EXAMPLE 4

Figure 3:
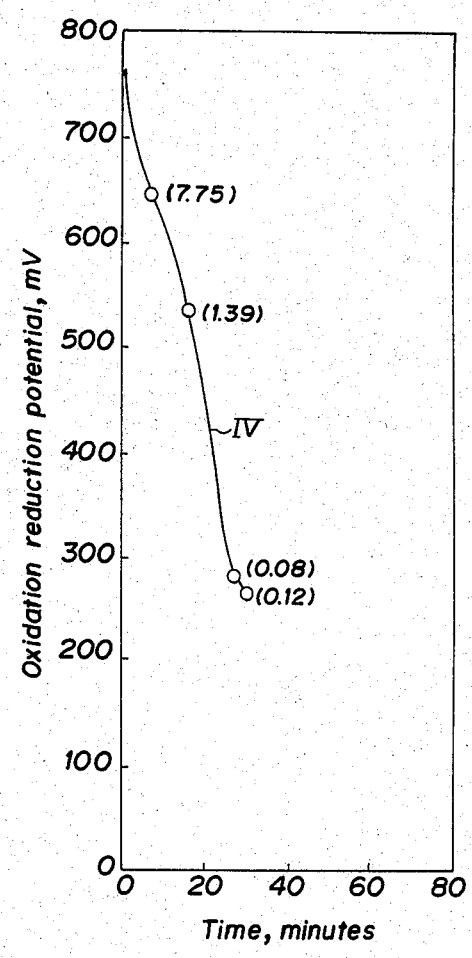

Into 98.4 ml of an aqueous solution at a pH of 6.5 containing red prussiate of potash in a concentration of 50.8 ppm as cyanide were added successively 1 ml of a 0.08 mole/liter aqueous solution of zinc sulfate, 1.6 ml of a 0.01 mole/liter aqueous solution of sodium thiosulfate and 1.6 ml of a 0.00491 mole/liter aqueous solution of sodium pyrosulfite in this order under continuous agitation in air by use of a magnetic stirrer and the value of pH 6.5 was maintained throughout by use of a pH-stat. Measurements in the lapse of time were undertaken in the same manner as in Example 1 for the oxidation-reduction potential and the residual cyanide concentration in the solution to give the results shown in FIG. 3 as a function of time. After 31 minutes from the start of the treatment the remaining volume of the solution was filtered by use of a filter paper as quickly as possible and the filtrate was analyzed for the residual cyanide concentration by the pyridine-pyrazolone method to give a result of 0.12 ppm.

EXAMPLE 5

Into 100 ml of an aqueous solution at a pH of 6.5 containing red prussiate of potash in a concentration of 50 ppm as cyanide were added successively 1 ml of a 0.08 mole/liter aqueous solution of zinc sulfate and 1.6 ml of an aqueous solution containing sodium sulfite and sodium thiosulfate always in the same overall concentration of 0.02 mole/liter but in a varied proportion in this order under continuous agitation in air by use of a magnetic stirrer while the value of pH 6.5 was maintained by use of a pH-stat. A small portion of the solution was taken periodically and analyzed for the residual cyanide concentration following filtration by use of a membrane filter as quickly as possible.

Figure 4:
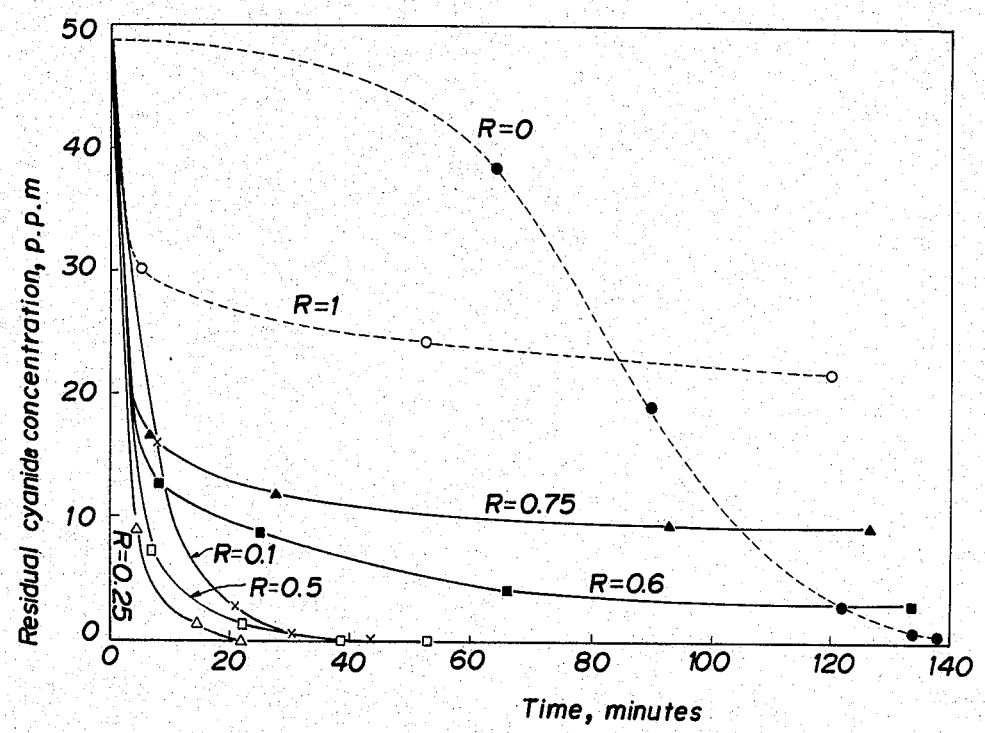

The results of the determination of the residual cyanide concentration are shown in FIG. 4 as a function of time for each of the experiments with varied molar proportions of the concentration of the sulfite to the overall concentration of the sulfite and the thiosulfate given by the numerical value of R for each of the curves, which is defined by the equation $$R = (Na_2SO_3)/[(Na_2SO_3) + (Na_2S_2O_3)].$$

As is understood from these results, the effectiveness of the treatment was particularly remarkable when the value of R was in the range from 0.1 to 0.5 and a residual cyanide concentration as low as 1 ppm or below could be achieved within 30 minutes.

EXAMPLE 6

Into 100 ml of an aqueous solution at a pH of 6.5 containing 0.0257 mole/liter of sodium sulfate in addition to red prussiate of potash in a concentration of 50 ppm as cyanide were added successively 1.2 ml of a 0.08 mole/liter aqueous solution of zinc sulfate and 3.2 ml of an aqueous solution containing sodium sulfite and sodium thiosulfate always in the same overall concentration of 0.02 mole/liter but in a varied proportion in this order under continuous agitation in air by use of a magnetic stirrer while the value of pH 6.5 was maintained by use of a pH-stat. A small portion of the solution was taken periodically and analyzed for the residual cyanide concentration following filtration by use of a membrane filter undertaken as quickly as possible.

The results of the determination are shown graphically in FIG. 5 in which each of the curves corresponds to an experiment carried out with a molar proportion of the sodium sulfite to the total of the thiosulfate and sulfite indicated by the value of R having the same meaning as defined in the preceding example. As is understood from these results, the effectiveness of the treatment was particularly remarkable when the value of R was in the range from 0.2 to 0.7. The residual cyanide concentration in the solution was decreased to 1 ppm or below within 30 minutes when the value of R was 0.2, 0.4, 0.5 or 0.6 and the time was 60 minutes or shorter when the value of R was 0.7.

Comparative Example 1

Into 98.4 ml of an aqueous solution of a pH of 6.5 containing red prussiate of potash in a concentration of 50.8 ppm as cyanide were added successively 1 ml of a 0.08 mole/liter aqueous solution of zinc sulfate and 3.2 ml of a 0.01 mole/liter aqueous solution of sodium thiosulfate in this order at a pH of 6.5 under continuous agitation in air by use of a magnetic stirrer and this value of pH was maintained by use of a pH-stat. Measurements in the lapse of time were undertaken in the same manner as in Example 1 for the oxidation-reduction potential and the residual cyanide concentration in the solution to give the results shown by the curve V in FIG. 1 and by the curve indicated as $R=0$ in FIG. 4, respectively, as a function of time.

As is clearly demonstrated by the comparison between the curves I and V in FIG. 1, in which latter case the residual cyanide concentration was 18.9 ppm even after 90 minutes of the treatment requiring a much longer time for the complete reduction of the residual cyanide concentration to 1 ppm or below, the method of the present invention is surprisingly superior to the conventional method.

Comparative Example 2

Into 98.4 ml of an aqueous solution at a pH of 6.5 containing red prussiate of potash in a concentration of 50.8 ppm as cyanide were added successively 1 ml of a 0.08 mole/liter aqueous solution of zinc sulfate and 3.2 ml of a 0.01 mole/liter aqueous solution of sodium sulfite in this order under continuous agitation in air by use of a magnetic stirrer while the value of pH 6.5 was maintained by use of a pH-stat. Measurements in the lapse of time were undertaken in the same manner as in Example 1 for the oxidation-reduction potential and the residual cyanide concentration in the solution to give the results shown in FIG. 1 by the curve VI as a function of time. Further, the results of the determination of the residual cyanide concentration are shown in FIG. 4 as a function of time by the broken line curve marked with R=1. In this case, the residual cyanide concentration was 21.3 ppm even after 120 minutes of the treatment.

Further comparative experiments were undertaken in the same manner as above except that the 0.01 mole/liter aqueous solution of sodium sulfite was replaced with an equal volume of a 0.01 mole/liter aqueous solution of sodium hydrogensulfite or a 0.00491 mole/liter aqueous solution of sodium pyrosulfite to give the results almost identical with those shown by the curve VI in FIG. 1. The residual cyanide concentration was 24.4 ppm or 29.8 ppm after 120 minutes of the treatment with sodium hydrogensulfite or after 129 minutes of the treatment with sodium pyrosulfite, respectively.

Comparative Example 3

Into 100 ml of an aqueous solution at a pH of 6.5 containing 0.0257 mole/liter of sodium sulfate in addition to red prussiate of potash in a concentration of 50 ppm as cyanide were added successively 1.2 ml of a 0.08 mole/liter aqueous solution of zinc sulfate and 3.2 ml of a 0.02 mole/liter aqueous solution of sodium thiosulfate in this order under continuous agitation in air by use of a magnetic stirrer while the value of pH 6.5 was maintained by use of a pH-stat. A small portion of the solution was taken periodically and analyzed for the residual cyanide concentration following filtration by use of a filter paper undertaken as quickly as possible to give the results shown in FIG. 5 by the broken line curve marked with R=0. The residual cyanide concentration in the solution was 46.1 ppm even after 107 minutes of the treatment.

Comparative Example 4

Into 100 ml of an aqueous solution at a pH of 6.5 containing 0.0257 mole/liter of sodium sulfate in addition to red prussiate of potash in a concentration of 50 ppm as cyanide were added successively 1.2 ml of a 0.08 mole/liter aqueous solution of zinc sulfate and 3.2 ml of a 0.02 mole/liter aqueous solution of sodium sulfite in this order under continuous agitation in air by use of a magnetic stirrer while the value of pH 6.5 was maintained by use of a pH-stat. A small portion of the solution was taken periodically and analyzed for the residual cyanide concentration following filtration by use of a filter paper undertaken as quickly as possible to give the results shown in FIG. 5 by the broken line curve marked with R=1. The residual cyanide concentration in the solution was 40.6 ppm even after 81 minutes of the treatment.

What is claimed is:

1. A method for removing iron-cyanide complexes from waste water containing iron-cyanide complexes including ferricyanides which comprises the steps of:

(a) adjusting the content of zinc ions in the waste water so that the waste water contains at least 2 moles of zinc ions per mole of the ferricyanides; and (b) mixing with the waste water of sulfite selected from the group consisting of sulfites, hydrogen-sulfites and pyrosulfites of alkali metals and a thiosulfate selected from the group consisting of alkali metal thiosulfates and ammonium thiosulfate, in amounts sufficient to reduce the ferricyanides to ferrocyanides and in a molar proportion of the sulfite to the thiosulfate in the range from 1:10 to 6:1 at a pH effective to reduce and precipitate the iron cyanide complexes in the form of zinc ferrocyanide; and (c) removing the thus precipitated zinc ferrocyanide from the waste water.

2. The improvement as claimed in claim 1 wherein the thiosulfate is added to the waste water prior to or simultaneously with the addition of the sulfite.

3. The improvement as claimed in claim 1 wherein the reduction of the ferricyanides with the reducing agent is performed with concurrent blowing of oxygen or an oxygen-containing gas into the waste water.

4. The improvement as claimed in claim 1 wherein the molar of the sulfite to the total amount of the sulfite and the thiosulfate is in the range from 0.1 to 0.7.

5. The method of claim 1 further comprising adjusting the pH of the waste water to substantial neutrality.

6. The method of claim 1 wherein said step (a) comprises adding a zinc salt to the waste water.

7. A method for removing iron-cyanide complexes from waste water containing iron-cyanide complexes including ferricyanides and at least 2 moles of of zinc ions per mole of ferricyanides, which comprises the steps of:

(a) mixing with the waste water a sulfite selected from the group consisting of sulfites, hydrogen-sulfites and and pyrosulfites of alkali metals, and a thiosulfate selected from the group consisting of alkali metal thiosulfates and ammonium thiosulfates, in amounts sufficient to reduce the ferricyanides to ferrocyanides, and in a molar proportion of the sulfite to the thiosulfate in the range from 1:10 to 6:1 at a pH effective to reduce and precipitate the iron cyanide complexes in the form of zinc ferrocyanide; and (b) removing the thus precipitated zinc ferrocyanide from the waste water.

8. The method of claim 7 further comprising adjusting the pH of the waste water to substantial neutrality.

9. The method of claim 7 further comprising adjusting the pH of the waste water so the waste water is at least slightly acidic.

10. The method of claim 7 wherein the thiosulfate is added to the waste water prior to or simultaneously with the addition of the sulfite.

11. The method of claim 7 wherein the reduction of the ferrycyanides with the reducing agent is performed with concurrent blowing of oxygen or an oxygen containing gas into the waste water.

12. The method of claim 7 wherein the molar ratio of the sulfite to the total amount of the sulfite and the thiosulfate is in the range from 0.1 to 0.7.

* * * * *